United States Patent
Kim

(10) Patent No.: US 9,888,349 B2
(45) Date of Patent: Feb. 6, 2018

(54) DEVICE FOR RECOMMENDING LOCATION IN BUILDING BY USING FINGERPRINT OF ACCESS POINT, AND METHOD USING SAME

(71) Applicant: SK PLANET CO., LTD., Seongnam-si, Gyeonggi-do (KR)

(72) Inventor: Min-Soeng Kim, Seoul (KR)

(73) Assignee: SK PLANET CO., LTD., Seongnam-si, Gyeonggi-Do (KR)

( * ) Notice: Subject to any disclaimer, the term of this patent is extended or adjusted under 35 U.S.C. 154(b) by 22 days.

(21) Appl. No.: 14/896,908

(22) PCT Filed: Oct. 29, 2014

(86) PCT No.: PCT/KR2014/010255
§ 371 (c)(1),
(2) Date: Dec. 8, 2015

(87) PCT Pub. No.: WO2015/163551
PCT Pub. Date: Oct. 29, 2015

(65) Prior Publication Data
US 2016/0157057 A1    Jun. 2, 2016

(30) Foreign Application Priority Data

Apr. 22, 2014  (KR) .................. 10-2014-0048058

(51) Int. Cl.
*H04W 24/00*  (2009.01)
*H04W 4/02*   (2009.01)
(Continued)

(52) U.S. Cl.
CPC ........... *H04W 4/023* (2013.01); *G01S 5/0252* (2013.01); *G01S 5/0278* (2013.01);
(Continued)

(58) Field of Classification Search
CPC ..... H04W 8/183; H04W 48/18; H04W 36/30; H04W 36/18; H04W 64/00; H04W 4/02
(Continued)

(56) References Cited

U.S. PATENT DOCUMENTS 8,385,943 B1    2/2013  Han et al.
9,144,052 B2 *  9/2015  Twell ................. H04W 64/00
(Continued)

FOREIGN PATENT DOCUMENTS

JP     2014055846 A      3/2014
KR  1020090059920 A      6/2009
(Continued)

OTHER PUBLICATIONS

International Search Report for PCT/KR2014/010255 dated Jan. 27, 2015.
(Continued)

*Primary Examiner* — Dai A Phuong
(74) *Attorney, Agent, or Firm* — Hauptman Ham, LLP

(57) ABSTRACT

Disclosed are a device for recommending locations in a building using fingerprints of access points and a method using the device. The locations of access points are detected by collecting fingerprints for the access points from terminals of multiple users, the locations of stores in the building are detected by using the fingerprints and payment histories of the multiple users, and locations may be recommended to a recommendation target user based on a meta-path, using a metamap generated by integrating the locations of the access points and stores with the indoor plan of the building. Indoor positioning is enabled by detecting the locations of access points using the information obtained from the terminals of multiple users, whereby constructing infrastructure information for the access points in the building in advance may not be required.

20 Claims, 11 Drawing Sheets

(51) Int. Cl.
*G01S 5/02* (2010.01)
*G06Q 30/02* (2012.01)
*H04W 64/00* (2009.01)
*H04W 4/04* (2009.01)
*G01C 21/20* (2006.01)
*H04W 84/12* (2009.01)

(52) U.S. Cl.
CPC ..... *G06Q 30/0251* (2013.01); *G06Q 30/0254* (2013.01); *G06Q 30/0255* (2013.01); *G06Q 30/0259* (2013.01); *G06Q 30/0261* (2013.01); *H04W 4/028* (2013.01); *H04W 4/043* (2013.01); *H04W 64/00* (2013.01); *G01C 21/206* (2013.01); *H04W 4/04* (2013.01); *H04W 84/12* (2013.01)

(58) Field of Classification Search
USPC ......... 455/414.2–414.3, 412.2, 456.1–456.3, 455/457
See application file for complete search history.

(56) References Cited

U.S. PATENT DOCUMENTS

| | | | | |
|---|---|---|---|---|
| 2006/0106850 | A1* | 5/2006 | Morgan | .............. G01S 5/02 |
| 2008/0057924 | A1 | 3/2008 | Stewart | |
| 2011/0110242 | A1* | 5/2011 | Nixon | ............. H04W 64/00 |
| | | | | 370/252 |
| 2012/0011247 | A1* | 1/2012 | Mallik | ............. H04W 8/005 |
| | | | | 709/224 |
| 2012/0046044 | A1 | 2/2012 | Jamtgaard et al. | |
| 2012/0072106 | A1 | 3/2012 | Han et al. | |
| 2012/0226554 | A1 | 9/2012 | Schmidt et al. | |
| 2013/0036010 | A1 | 2/2013 | Stewart | |
| 2013/0281111 | A1 | 10/2013 | Syrjarinne et al. | |
| 2013/0311282 | A1* | 11/2013 | Cochrane, II | .......... G06Q 30/02 |
| | | | | 705/14.53 |
| 2014/0011518 | A1 | 1/2014 | Valaee et al. | |
| 2015/0140933 | A1* | 5/2015 | Muller | ................ H04W 4/12 |
| | | | | 455/41.2 |
| 2016/0080899 | A1* | 3/2016 | Fisher | ............... G06Q 10/06 |
| | | | | 709/217 |
| 2016/0292776 | A1* | 10/2016 | Tamir | ................. G06Q 90/20 |
| 2017/0109792 | A1* | 4/2017 | Kim | ................ G06Q 30/0267 |
| 2017/0206536 | A1* | 7/2017 | Brelig | ............... G06Q 30/0201 |

FOREIGN PATENT DOCUMENTS

| | | |
|---|---|---|
| KR | 1020110133337 A | 12/2011 |
| KR | 1020120007360 A | 1/2012 |
| KR | 1020120010114 A | 2/2012 |
| KR | 1020130002240 A | 1/2013 |
| KR | 1020130116091 A | 10/2013 |
| WO | 2009072735 A1 | 6/2009 |

OTHER PUBLICATIONS

European Search Report dated Apr. 21, 2017 corresponding to European Application No. EP 14889815.8.

* cited by examiner

DEVICE FOR RECOMMENDING LOCATION IN BUILDING BY USING FINGERPRINT OF ACCESS POINT, AND METHOD USING SAME

CROSS REFERENCE TO RELATED APPLICATION

This application claims the benefit of Korean Patent Application No. 10-2014-0048058, filed Apr. 22, 2014, in the Korean Patent and Trademark Office. Further, this application is the National Phase application of International Application No. PCT/KR2014/010255 filed on Oct. 29, 2014, which is hereby incorporated by reference in its entirety into this application.

TECHNICAL FIELD

The present invention generally relates to a device for recommending locations in a building using fingerprints of access points and a method using the device, which recommend locations to a user based on information collected from multiple user terminals even if there is no information about the locations of the access points in the building. More particularly, the present invention relates to a device for recommending locations in a building using fingerprints of access points and a method using the device, which detect the locations of the access points and stores in the building by collecting fingerprints for the access points installed in the building from multiple user terminals, and may recommend locations to a recommendation target user using a metamap generated by integrating the locations of the access points and stores in the building with the indoor plan of the building.

BACKGROUND ART

In the field of indoor positioning, efforts to improve precision by processing various signals including infrared rays, ultrasonic waves, magnetic fields, Wi-Fi, vision, and the like, have been continued. As smart phones in which Wi-Fi modules are embedded are widely used, the easiest approach for indoor positioning is a method using fingerprints of Wi-Fi Access Points (APs).

The fingerprinting method generates an indoor magnetic field map in advance and estimates a location by comparing a value measured by the geomagnetic sensor of a smart phone with the information in the map. According to Bell Laboratories in the U.S., such a fingerprinting method based on Wi-Fi has high precision, with a position error of only 1 to 2 m. However, maintenance is expensive, and localization is slow because the size of the map to be generated is very large.

Most conventional indoor positioning techniques require the construction of infrastructures in advance. In other words, the locations of Wi-Fi APs in a building must be known, and without such information, neither the localization of a user in the building nor recommendations based on the location of the user is possible. Also, APs are installed in places where the interference of APs from components of the building is minimized, APs may be easily connected, and the aesthetic appearance of the interior is not spoiled by the installation of APs, rather than being installed at regular distances. Furthermore, the locations of APs may often change due to the failure and replacement thereof. Therefore, even if the locations of APs in a building are detected in advance, additional effort to maintain the information is required.

The present invention detects the probabilistic locations of APs based on information collected from multiple user terminals even if there is no information about the locations of APs in a building, and proposes an indoor localization technique based on the information about the APs. Also, based on this indoor localization technique, the present invention intends to disclose a technique for recommending locations according to user preference and the current location of a user when the user enters a certain level of a building that has multiple levels.

As a related art of the present invention, there is Korean Patent Application Publication No. 10-2011-0133337, disclosed at Dec. 12, 2011 and titled "method and apparatus for providing advertisement based on position information of subscriber".

DISCLOSURE

Technical Problem

An object of the present invention is to realize a positioning service using the fingerprints of access points by enabling indoor positioning even if there is no information about the access points in a building.

Also, another object of the present invention is to detect the location of a recommendation target user through indoor positioning and to recommend locations according to user preference, whereby the recommendation target user may conveniently and quickly move in the building.

Technical Solution

In order to accomplish the above object, a device for recommending a location according to the present invention includes: an access point location detection unit for detecting locations of one or more access points by collecting fingerprints for the one or more access points installed in the building from terminals of multiple users; a store location detection unit for detecting locations of stores in the building using the fingerprints and payment histories of the multiple users; a metamap generation unit for generating a metamap by integrating the locations of the one or more access points and the locations of the stores with an indoor plan of the building; a user path estimation unit for estimating a meta-path of a recommendation target user using the fingerprints obtained from a terminal of the recommendation target user; and a location recommendation unit for recommending a location to the recommendation target user based on the meta-path, using the metamap and preference information of the recommendation target user.

The store location detection unit may detect locations of one or more adjacent stores located in a range predetermined based on each of the one or more access points among the stores, using a difference between a time when each of the fingerprints is obtained and a payment time included in the payment histories.

The store location detection unit may detect the locations of the one or more adjacent stores when the difference between the time when each of the fingerprints is obtained and the payment time included in the payment histories falls within a predetermined reference difference.

The locations of the one or more adjacent stores may be relative locations to an access point corresponding to the one or more adjacent stores, the access point being selected from the one or more access points.

When the number of the access points corresponding to the one or more adjacent stores is two or more, the store location detection unit may correct the locations of the one or more adjacent stores using relative locations to each of the two or more access points corresponding to the one or more adjacent stores.

The device for recommending a location may further include a plan acquisition unit for obtaining the indoor plan on which at least one of an area and a length of each section of the building is electronically marked.

The plan acquisition unit may overlap at least one of tenant information of the stores corresponding to the indoor plan and category information for the stores obtained using the tenant information on the indoor plan.

The plan acquisition unit may update the tenant information using the payment histories.

The location recommendation unit may recommend a location of a recommended store corresponding to the preference information to the recommendation target user using the category information, the recommended store being selected from the one or more adjacent stores corresponding to a current location of the recommendation target user on the meta-path.

The location recommendation unit may recommend the location of the recommended store located in a moving direction defined by the meta-path to the recommendation target user.

The device for recommending a location may further include a discount voucher provision unit for transmitting a discount voucher corresponding to the recommended store to the terminal of the recommendation target user.

The access point location detection unit may detect a number of the one or more access points installed in the building using the fingerprints.

The store location detection unit may detect a level on which the stores are located using at least one of periodically collected store location information and user comment information collected on web.

The device for recommending a location may further include a payment information acquisition unit for obtaining the payment histories of the multiple users.

A method for recommending a location according to the present invention includes: detecting locations of one or more access points by collecting fingerprints for the one or more access points installed in the building from terminals of multiple users; detecting locations of stores in the building using the fingerprints and payment histories of the multiple users; generating a metamap by integrating the locations of the one or more access points and the locations of the stores with an indoor plan of the building; and estimating a meta-path of a recommendation target user using the fingerprints obtained from a terminal of the recommendation target user and recommending a location to the recommendation target user based on the meta-path, using the metamap and preference information of the recommendation target user.

Detecting the locations of the stores comprises calculating a difference between a time when each of the fingerprints is obtained and a payment time included in the payment histories, and locations of one or more adjacent stores located in a range predetermined based on each of the one or more access points among the stores may be detected using the difference between the time when each of the fingerprints is obtained and the payment time included in the payment histories.

The locations of the one or more adjacent stores may be relative locations to an access point corresponding to the one or more adjacent stores, the access point being selected from the one or more access points.

The method for recommending a location further includes obtaining the indoor plan on which at least one of an area and a length of each section of the building is electronically marked, wherein obtaining the indoor plan may be configured to overlap at least one of tenant information of the stores corresponding to the indoor plan and category information for the stores obtained using the tenant information on the indoor plan.

Recommending the location may be configured to recommend a location of a recommended store corresponding to the preference information to the recommendation target user using the category information, the recommended store being selected from the one or more adjacent stores corresponding to a current location of the recommendation target user on the meta-path.

Advantageous Effects

According to the present invention, when a positioning service using fingerprints of access points installed in a building is used, even if there is no infrastructure information about the access points of the building, the positioning service using indoor positioning may be provided by using access point information collected from multiple user terminals.

Also, the present invention recommends the locations of preferable shops and stores in a building by detecting the current location and the meta-path of a user who enters the building, using fingerprints of access points, whereby the user may move in the building conveniently and quickly.

BEST MODE

Figure 1:
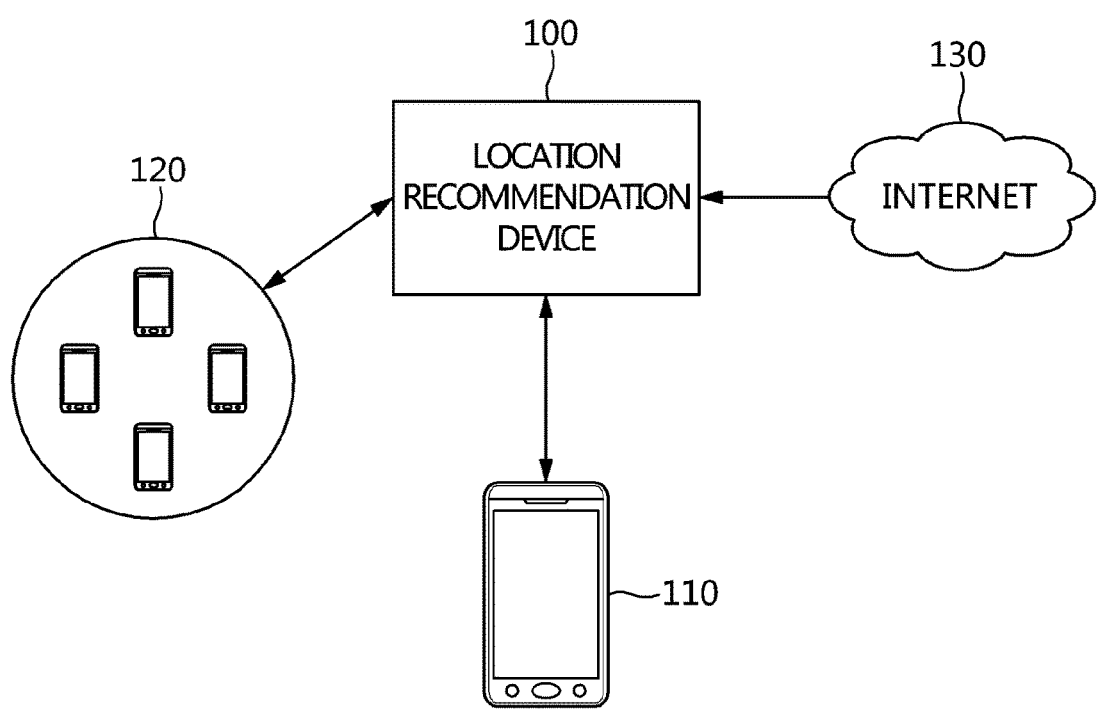
FIG. 1 is a view illustrating a system for recommending locations in a building, according to an embodiment of the present invention.

The present invention will be described in detail below with reference to the accompanying drawings. Repeated descriptions and descriptions of known functions and configurations which have been deemed to make the gist of the present invention unnecessarily obscure will be omitted below. It should be noted that the same reference numerals are used to designate the same or similar elements throughout the drawings.

Terms or words used in this specification and claims should not be interpreted according to typical or dictionary meaning, but have to be interpreted as the meaning and concept adaptive to the technical idea of the present invention based on a principle that an inventor may properly define the concept of the terms in order to explain the present invention in the best way. Therefore, embodiments disclosed in this specification and configurations illustrated in the drawings are merely preferred embodiments of the present invention and do not fully describe the technical idea of the present invention, thus there may be various equivalents and alterations replacing them at a filing date of the present application. Also, it will be understood that, although the terms first, second, etc. may be used herein to describe various elements, these elements should not be limited by these terms. These terms are only used to distinguish one element from another.

FIG. 1 is a view illustrating a system for recommending locations in a building, according to an embodiment of the present invention.

Referring to FIG. 1, a system for recommending locations in a building, according to an embodiment of the present invention, may include a location recommendation device 100, a recommendation target user's terminal 110, multiple users' terminals 120, and the Internet 130.

The location recommendation device 100 may detect the locations of one or more access points by collecting fingerprints for the one or more access points installed in a building from the terminals 120 of multiple users. The technique using the fingerprints is a method in which an indoor magnetic field map is generated in advance and a location is estimated by comparing a value measured by the geometric sensor of a user terminal with the information in the map.

In this case, the number of the one or more access points installed in the building may be detected using the fingerprints. For example, when multiple users move around each level of a specific building, the fingerprints of access points may be collected through communication with the access points installed in various locations. In the case of an access point, there may be interference between levels according to the building, but the number of access points present in a building may be detected when information from multiple users is accumulated.

Also, the location recommendation device 100 may acquire the payment histories of multiple users. For example, payment transaction information generated in a store may be acquired using a mobile card mounted in a user terminal, or payment histories may be acquired through a service in which both smart phone subscriber information and card payment histories of the subscriber are obtained.

Also, the location recommendation device 100 may detect the locations of stores in a building using the fingerprints collected from the terminals 120 of multiple users and payment histories of the multiple users.

In this case, using the difference between the time at which a fingerprint is acquired and the payment time included in a payment history, it is possible to detect the locations of one or more adjacent stores located in a range predetermined based on each of one or more access points. For example, if the fingerprint of the access point A is acquired from the terminal of a specific user at 2:50 p.m. and the specific user made a payment at the store B at 3 p.m., the store B may be located on a concentric circle that corresponds to a 10-minute walking distance from the access point A.

In this case, if the difference between the time when the fingerprint is acquired and the payment time falls within a predetermined reference difference, the locations of the one or more adjacent stores may be detected. For example, the reference difference is set by considering the average stride of adults, the size of the building, and the like, and among information generated from multiple users, only information satisfying the condition in which the difference between the time when a fingerprint is acquired and the time when payment is made at a specific store falls within the predetermined reference difference may be used to detect the location.

In this case, the locations of the one or more adjacent stores may be relative locations based on an access point corresponding to the one or more adjacent stores, the access point being selected from the one or more access points.

Here, if there are two or more access points corresponding to the one or more adjacent stores, the locations of the one or more adjacent stores may be corrected using the relative locations to each of the two or more access points corresponding to the one or more adjacent stores. For example, an area in which a specific store is more likely to exist according to the payment history may be determined based on the access points. If, based on two access points, areas with high probability that a specific store exists therein overlap each other, it may be detected how far the specific store is located from each of the two access points. When the relationship between a specific store and multiple access points is calculated according to probabilities through such a method, the range encompassing the location of the specific store may be precisely determined.

In this case, which level the stores are located on may be detected using at least one of periodically collected store location information and user comments collected on the Web. Using the fingerprints of access points acquired from the terminals 120 of multiple users, the locations or the number of the access points in a building can be detected, but it is difficult to detect which level each of the access points is located on. The level on which the access points are located may be accurately detected by overlapping the locations of all the access points on the indoor map in advance, but it is difficult to apply this method to a plurality of various buildings in practice. Therefore, the level may be detected using the store location information periodically collected by people, or the level may be estimated by intensively analyzing keywords such as 'building name', 'location name', 'store name', and 'level' included in user comments collected on the Internet 130. For example, information indicating that the store 'Gimbab Sarang' is located on the '10th' floor of the 'COEX' building may be obtained, and the level may be detected by collecting user comments on the Internet, such as "I went to 'COEX' and had lunch at 'Gimbab Sarang'", or "The food at 'Gimbab Sarang' on the '10th floor' tastes good".

Also, the location recommendation device 100 may generate a metamap by integrating the locations of one or more access points and stores with the indoor plan of a building. For example, the metamap may be represented in the form of a graph showing the relationship between a store and an access point by continuously marking the point at which the probability that the specific store exists is the highest, based on the specific access point. In this case, because of high mobility between levels or the locations of access points, the relative location of a store that is located on a level different from the level on which the access point is located may be calculated. However, the effect of interference between levels may be decreased by data collected from multiple users, and a store connected to a certain number of access points is difficult to connect to another access point. Therefore, when an access point and a store are not connected to each other, the store and the access point are assumed to be on different levels, and they are also assumed not to be within interference range.

Also, the location recommendation device 100 may estimate the meta-path of a recommendation target user using the fingerprints acquired from the terminal 110 of the recommendation target user. For example, using the fingerprints acquired from the terminal 110 of the recommendation target user, which access point is located near the user may be detected, and the meta-path showing which access points the user has passed through may be estimated. In reality, whether the user is moving to the east side or the west side or whether the user is moving along a specific corridor may be unknown, but it is possible to detect which stores are close to the area that the user is moving to.

Also, the location recommendation device 100 may obtain an indoor plan on which at least one of the area and the length of each section of a building is electronically marked.

In this case, at least one of the information about the tenants in the stores corresponding to the indoor plan and the category information for each of the stores, acquired using the tenant information, may be overlaid on the indoor plan. For example, the type of business is analyzed based on the name or the business registration number of the store overlaid on the indoor plan, whereby the category information, for example, whether the store is a restaurant or a clothing store, may be detected. This information may be detected based on business name registration information, and may additionally be detected by collecting content on the Internet 130. Also, information about product lines or the types of goods sold by each of the stores may be accumulated by collecting information. Also, it is possible to induce a store, which intends to provide recommendations for a specific user group in a building, to voluntarily provide information through a system.

In this case, the tenant information may be updated using payment histories. For example, when payment histories for a store that was located in a specific location A have not been made for a long time, or when the type of goods paid for, checked via the payment histories, has changed, the tenant information may be updated to reflect that the store that was in A has gone or the business type of the store in A has changed. Also, because a large-scale store such as a movie theater or a superstore is less likely to disappear in a short time, information about which level such a store is located on is collected, and then the location may be fixed.

Also, using a metamap and information about the preferences of a recommendation target user, the location recommendation device 100 may recommend locations to the recommendation target user based on the meta-path. For example, if the user preference information includes the name of a specific store, the location of the specific store, located near the meta-path of the user, may be recommended.

In this case, using the category information, the location of a recommended store corresponding to the preference information, selected from one or more adjacent stores corresponding to the current location of a recommendation target user on the meta-path, may be recommended to the recommendation target user. For example, if the information about the preferences of the recommendation target user includes information about clothes or accessories such as bags, the location of an adjacent store, corresponding to the category of clothes or accessories, may be recommended by being selected from the one or more adjacent stores.

In this case, the location of a recommended store located along the meta-path in the moving direction may be recommended to the user. For example, when the meta-path of the recommendation target user moves from the east side to the west side, a recommended store corresponding to the user preference information may be recommended by being selected from one or more adjacent stores located in the area in which the user will arrive, namely, at least one adjacent store located on the west side.

Also, the location recommendation device 100 may transmit discount vouchers corresponding to the recommended store to the terminal 110 of the recommendation target user. For example, when the recommendation target user is near a theater in a relevant building, a discount voucher for a movie is transmitted to the terminal 110 of the recommendation target user, or vouchers for restaurants located in the relevant building or a nearby building may be transmitted by detecting payment histories in the theater in real time.

The terminal 110 of the recommendation target user transmits the fingerprints obtained by accessing at least one access point to the location recommendation device 100, whereby the location recommendation device 100 may estimate the meta-path of the recommendation target user. Then, the location recommendation device 100 may determine a recommended location based on the meta-path of the recommendation target user, and may transmit the recommended location to the terminal 110 of the recommendation target user.

The terminals 120 of multiple users may access one or more access points installed in a building, and may obtain fingerprints for each of the access points. The locations or the number of access points installed in the building may be determined using the fingerprints obtained from the terminals 120 of multiple users. Also, based on the access points, the relative locations of the stores located and operated inside the building may be detected by acquiring payment histories from the terminals 120 of multiple users.

The Internet 130 may provide information that is necessary for detecting which level the stores are located on in the building because it is difficult to obtain such information from the fingerprints of access points and payment histories obtained from the terminals 120 of multiple users. For example, keywords corresponding to the building name, the name of the store in the building, or the level may be obtained from information included in user comments, whereby the level on which the stores are located in the building may be obtained. Also, in order to detect category information for the stores, content collected on the Internet 130 may be used.

When the system for recommending locations in a building, described above, is used, a location recommendation service through indoor positioning may be provided even in a building in which no infrastructure information is constructed for access points or stores of the building.

Figure 2:
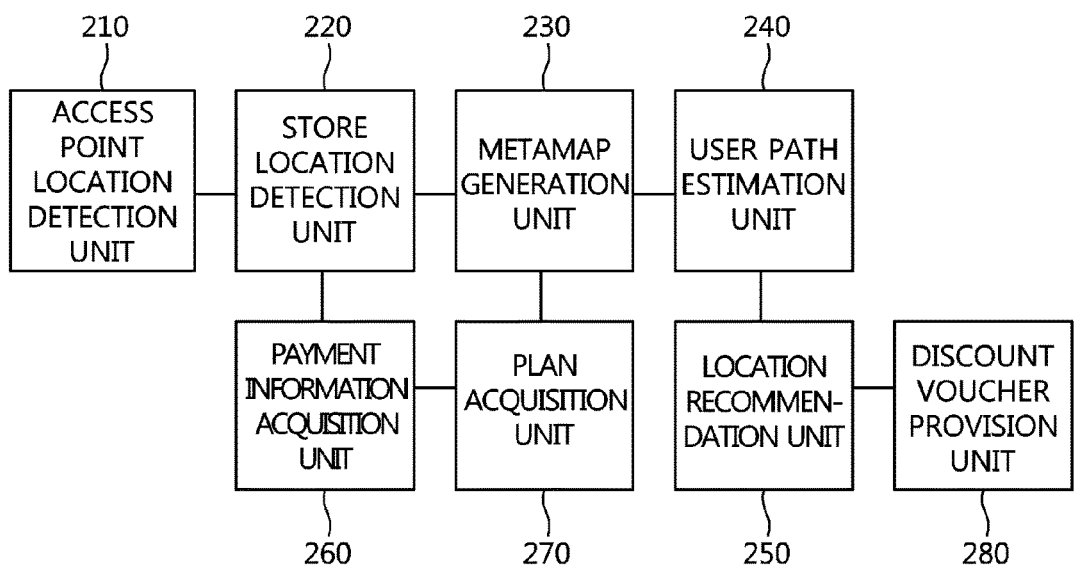
FIG. 2 is a block diagram illustrating a device for recommending locations in a building, according to an embodiment of the present invention.

FIG. 2 is a block diagram illustrating a device 100 for recommending locations in a building, according to an embodiment of the present invention.

Referring to FIG. 2, the device 100 for recommending locations in a building may include an access point location detection unit 210, a store location detection unit 220, a metamap generation unit 230, a user path estimation unit 240, a location recommendation unit 250, a payment information acquisition unit 260, a plan acquisition unit 270, and a discount voucher provision unit 280.

The access point location detection unit 210 may detect the locations of one or more access points by collecting fingerprints for the one or more access points installed in a building from multiple user terminals. The technique using the fingerprints is a method in which an indoor magnetic field map is generated in advance and a location is estimated by comparing a value measured by the geometric sensor of a user terminal with the information in the map.

In this case, the number of the one or more access points installed in the building may be detected using the fingerprints. For example, when multiple users move around each level of a specific building, fingerprints of access points may be collected through communication with the access points installed in various locations. In the case of an access point, there may be interference between levels according to the building, but the number of access points that are present in a building may be detected when information from multiple users has been accumulated.

The store location detection unit 220 may detect the locations of stores in a building using the fingerprints collected from the terminals of multiple users and payment histories of the multiple users.

In this case, using the difference between the time when a fingerprint is acquired and the payment time included in a payment history, it is possible to detect the locations of one or more adjacent stores located in a range predetermined based on each of one or more access points. For example, if the fingerprint of the access point A is acquired from the terminal of a specific user at 2:50 p.m. and the specific user made a payment at the store B at 3 p.m., the store B may be located on a concentric circle that indicates 10-minute walking distance from the access point A.

In this case, if the difference between the time when the fingerprint is acquired and the payment time falls within a predetermined reference difference, the locations of the one or more adjacent stores may be detected. For example, the reference difference is set by considering the average stride of adults, the size of the building, and the like, and among information generated from multiple users, only information satisfying the condition in which the difference between the time when a fingerprint is acquired and the time when payment is made at a specific store falls within the predetermined reference difference may be used for detecting the location.

In this case, the locations of the one or more adjacent stores may be relative locations based on an access point corresponding to the one or more adjacent stores, the access point being selected from the one or more access points.

Here, if there are two or more access points corresponding to the one or more adjacent stores, the locations of the one or more adjacent stores may be corrected using the relative locations to each of the two or more access points corresponding to the one or more adjacent stores. For example, an area in which a specific store is more likely to exist according to the payment history may be determined based on the access points. If, based on two access points, areas with high probability that a specific store exists therein overlap each other, it may be detected how far the specific store is located from the two access points. When the relationship between a specific store and multiple access points is calculated according to probabilities through such a method, the range including the location of the specific store may be precisely determined.

In this case, which level the stores are located on may be detected using at least one of periodically collected store location information and user comments collected on the Web. Using the fingerprints of access points acquired from the terminals of multiple users, the locations or the number of the access points in a building can be detected, but it is difficult to detect which level each of the access points is located on. The level on which the access points are located may be accurately detected by overlapping the locations of all the access points on the indoor map in advance, but it is difficult to apply this method to a plurality of various buildings in practice. Therefore, the level may be detected using the store location information periodically collected by people, or the level may be estimated by intensively analyzing keywords such as 'building name', 'location name', 'store name', and 'level' included in user comments collected on the Internet 130. For example, information indicating that the store 'Gimbab Sarang' is located on the '10th' floor of the 'COEX' building may be obtained and the level may be detected by collecting user comments on the Internet, such as "I went to 'COEX' and had lunch at 'Gimbab Sarang'", or "The food at 'Gimbab Sarang' on the '10th floor' tastes good".

The metamap generation unit 230 may generate a metamap by integrating the locations of one or more access points and stores with the indoor plan of a building. For example, the metamap may be represented in the form of a graph showing the relationship between a store and an access point by continuously marking the point at which the probability that the specific store exists is the highest based on the specific access point. In this case, because of high mobility between levels or the locations of access points, the relative location of a store that is located on a level different from the level on which the access point is located may be calculated. However, the effect of interference between levels may be decreased by data collected from multiple users, and a store connected to a certain number of access points is difficult to connect to another access point. Therefore, when an access point and a store are not connected to each other, the store and the access point are assumed to be on different levels, and they are assumed not to be within interference range.

The user path estimation unit 240 may estimate the meta-path of a recommendation target user using the fingerprints acquired from the terminal of the recommendation target user. For example, using the fingerprints acquired from the terminal of the recommendation target user, which access point is located near the user may be detected, and a meta-path showing which access points the user has passed through may be estimated. Actually, whether the user is moving to the east side or the west side or whether the user is moving along a specific corridor cannot be known, but it is possible to detect which stores are close to the area that the user is moving to.

Using a metamap and information about the preferences of a recommendation target user, the location recommendation unit 250 may recommend locations to the recommendation target user based on the meta-path. For example, if the user preference information includes the name of a specific store, the location of the specific store located near the meta-path of the user may be recommended.

In this case, using the category information, the location of a recommended store corresponding to the preference information, selected from one or more adjacent stores corresponding to the current location of a recommendation target user on the meta-path, may be recommended to the recommendation target user. For example, if the information about the preferences of the recommendation target user includes information about clothes or accessories such as bags, the location of an adjacent store corresponding to the category of clothes or accessories may be recommended by being selected from the one or more adjacent stores.

In this case, the location of a recommended store located along the meta-path in the moving direction may be recommended to the user. For example, when the meta-path of the recommendation target user moves from the east side to the west side, a recommended store corresponding to the user preference information may be recommended by being selected from one or more adjacent stores located in the area in which the user will arrive, namely, at least one adjacent store located on the west side.

The payment information acquisition unit 260 may acquire the payment histories of multiple users. For example, payment transaction information generated in a store may be acquired using a mobile card mounted in a user terminal, or payment histories may be acquired through a service in which both smart phone subscriber information and card payment histories of the subscriber are obtained.

The plan acquisition unit 270 may acquire an indoor plan on which at least one of the area and the length of each section of a building is electronically marked.

In this case, at least one of the tenant information of the stores corresponding to the indoor plan and the category information for each of the stores, acquired using the tenant information, may be overlaid on the indoor plan. For example, the type of business is analyzed based on the name or the business registration number of the store overlaid on the indoor plan, whereby the category information, for example, whether the store is a restaurant or a clothing store, may be detected. This information may be detected based on business name registration information, and may additionally be detected by collecting content on the Internet. Also, information about product lines or the types of goods sold by each of the stores may be accumulated by collecting information. Also, it is possible to induce a store, which intends to provide recommendations for a specific user group in a building, to voluntarily provide information through a system.

In this case, the tenant information may be updated using payment histories. For example, when payment histories for the store that was located at a specific location A have not been made for a long time or when the type of goods paid for, checked via the payment histories, has changed, the tenant information may be updated to reflect that the store that was in A has gone or that the business type of the store in A has changed. Also, because a large-scale store such as a movie theater or a superstore is less likely to disappear in a short time, after information about which level such a store is located on is collected, the location may be fixed.

The discount voucher provision unit 280 may transmit discount vouchers corresponding to the recommended store to the terminal of the recommendation target user. For example, when the recommendation target user is near a theater in a relevant building, a discount voucher for a movie is transmitted to the terminal of the recommendation target user, or vouchers for restaurants located in the relevant building or a nearby building may be transmitted by detecting payment histories in the theater in real time.

Because a location recommendation service is provided using the above-mentioned location recommendation device 100 even in a building in which no infrastructure information is gathered in advance, users using the service may conveniently and quickly detect the locations in the building.

Figure 3A:
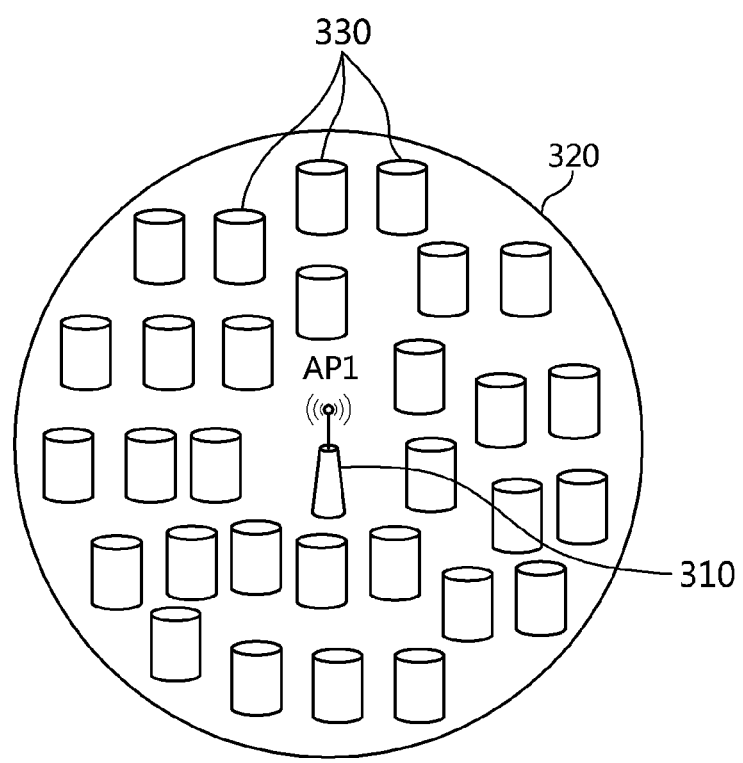
FIGS. 3A and 3B are views illustrating the distribution of the relative locations of stores based on access points, according to an embodiment of the present invention.
Figure 3B:
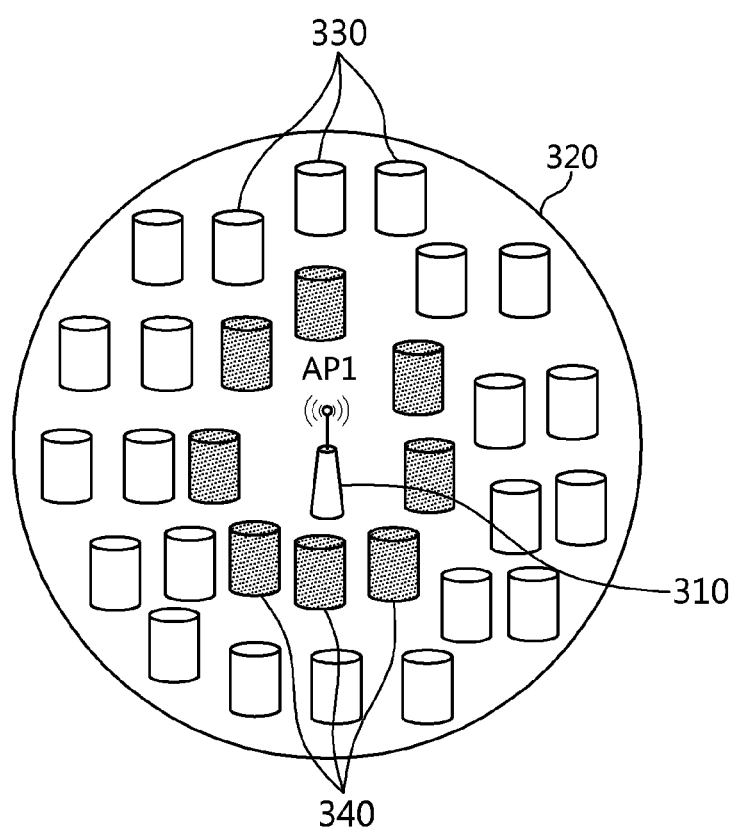

FIGS. 3A and 3B are views illustrating the distribution of the relative locations of stores based on access points, according to an embodiment of the present invention.

Referring to FIGS. 3A and 3B, FIG. 3A shows a result for a single user, and the locations 330 in which a store is likely to exist based on the first access point 310 are marked within the probability distribution range 320 of the first access point 310. Also, when the distribution of FIG. 3A is accumulated by obtaining both the fingerprints of the first access point 310 and the time when payment is made at the store from multiple users, locations 340 having a high probability that the store exists therein may be generated, and thus the range may be narrowed down.

Figure 4A:
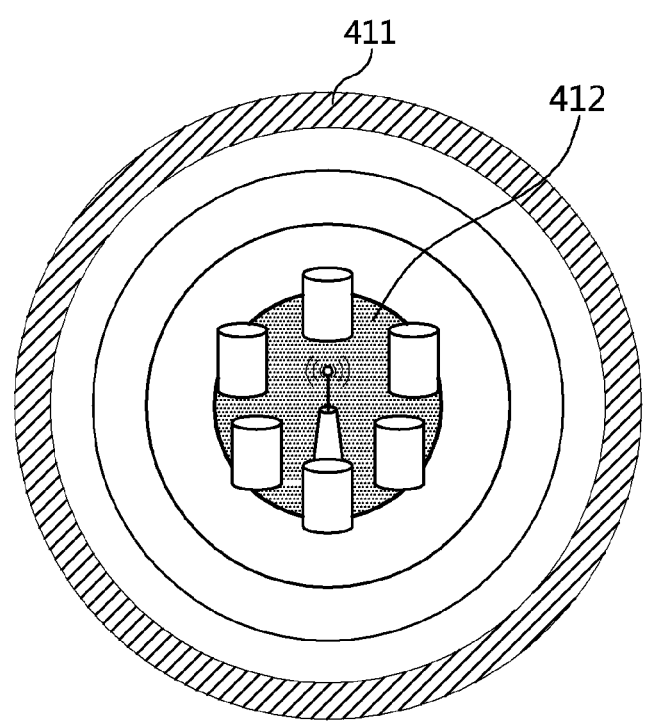
FIGS. 4A and 4B are views illustrating the probabilistic distribution of the locations of a single access point and a single store, according to an embodiment of the present invention.
Figure 4B:
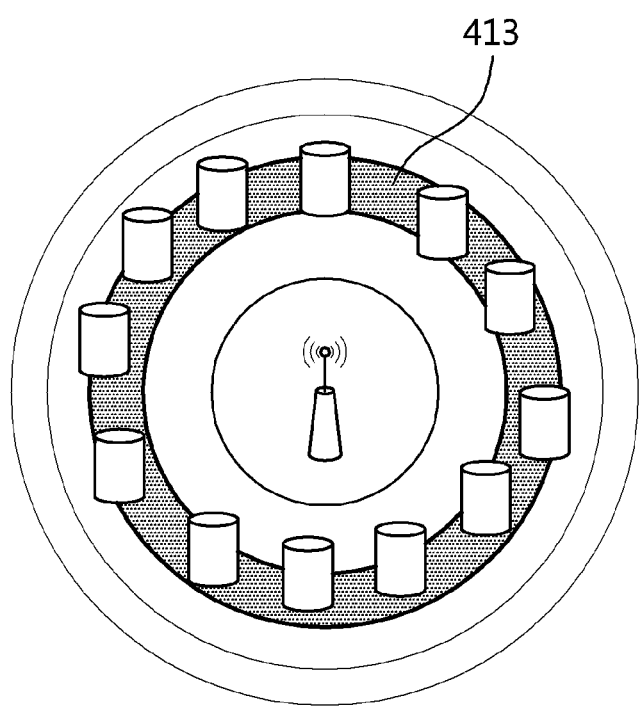

FIGS. 4A and 4B are views illustrating the probabilistic distribution of the locations of a single access point and a single store, according to an embodiment of the present invention.

Referring to FIGS. 4A and 4B, the distribution of the relative locations of the store illustrated in FIGS. 3A and 3B is illustrated according to probability. In FIG. 4A, if the concentric circles generated based on an access point indicate the location ranges of a store, the store is more likely to exist closer to the store location range 412 than to the store location range 411. Conversely, in FIG. 4B, the probability that the store exists in the store location range 413 is the highest. The reason why the probabilistic distribution of the locations of the store is different is that payment may not be made near the access point. If the locations closest to the access point shown in FIG. 4A are excluded, it may be considered that the store is highly likely to exist at a certain distance apart from the access point, as shown in FIG. 4B.

Figure 5A:
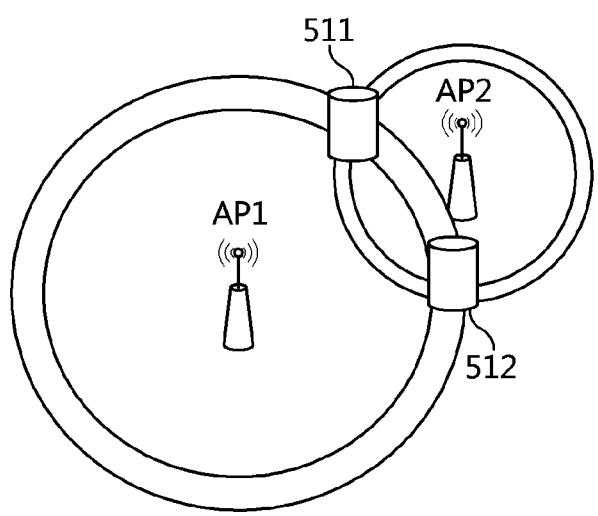
FIGS. 5A and 5B are views illustrating the probabilistic distribution of the locations of multiple access points and a single store, according to an embodiment of the present invention.
Figure 5B:
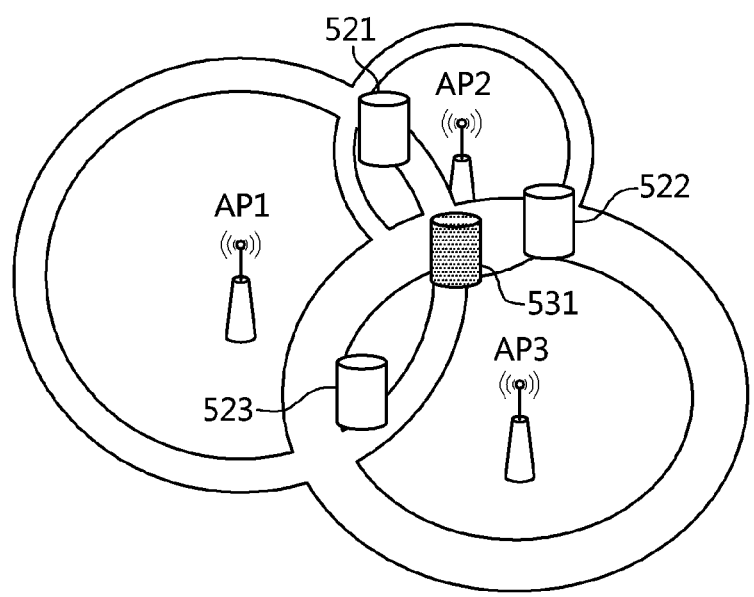

FIGS. 5A and 5B are views illustrating the probabilistic distribution of the locations of multiple access points and a single store, according to an embodiment of the present invention.

Referring to FIGS. 5A and 5B, the bands in the form of a concentric circle generated based on the first access point and the second access point may indicate the areas in which a store is likely to exist based on the access points. As shown in FIG. 5A, when the information for the two access points is overlaid, the absolute location of the store is unknown but the location information 511 and 512, indicating the location in which the store is likely to exist based on the two access points, namely, information indicating how far the single store is located from the two access points, may be checked.

FIG. 5B acquires the location information 531 indicating a location with a high probability that a certain store exists there by adding an area based on the third access point to the configuration illustrated in FIG. 5A. In this case, although the pieces of location information 521, 522, and 523, indicating locations with a possibility that a store exists there based on the three access points, have a lower possibility compared to the location information 531, indicating a location with a high probability that the store exists there, they still have some possibility that the store exists there. Using such information, the present invention may detect which access point is located near a user and which stores are located near the access point rather than the exact location of an access point or a store.

Figure 6:
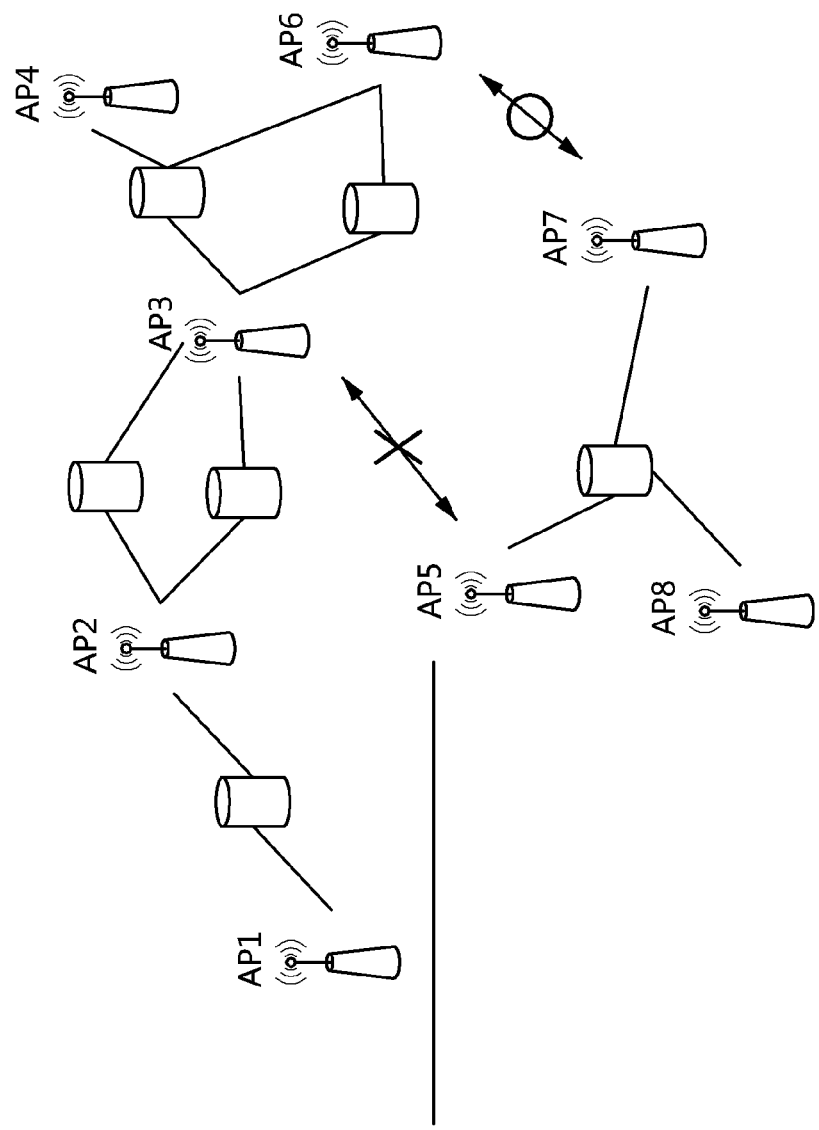
FIG. 6 is a view illustrating the relationship between the distances between a store and multiple access points, according to an embodiment of the present invention.

FIG. 6 is a view illustrating the relationship between the distances between a store and multiple access points, according to an embodiment of the present invention.

Referring to FIG. 6, the relationship between the distances between a store and multiple access points may be represented using a metamap. By continuously marking the point at which the probability that a specific store exists is the highest based on a specific access point, the relationship between the store and the access point may be represented in the form of a graph, as shown in FIG. 6.

In this case, it is difficult to obtain information about a shadow area in which access point information cannot be obtained. Also, for a fixed number of access points in a building, even if the effect of interference between levels may be decreased using data collected from multiple users and a store connected to a certain number of access points is difficult to connect to another access point, the relative location of a store that is located on a level different from the level on which the access point is located may be calculated because of high mobility between levels or the locations of access points.

In this case, excluding payment histories, when a direction is drawn by following the sequence of access points accessed by a user, the direction of access points accessed by multiple users may be obtained. For example, when data of multiple users, in which access to the seventh access point immediately follows access to the sixth access point, can be found but the sequence linking the third access point to the fifth access point has relatively low frequency, it may be confirmed that the point linking two separate groups is the point linking the sixth access point and the seventh access point. Through such a method, a path that links separate groups may be found.

Figure 7:
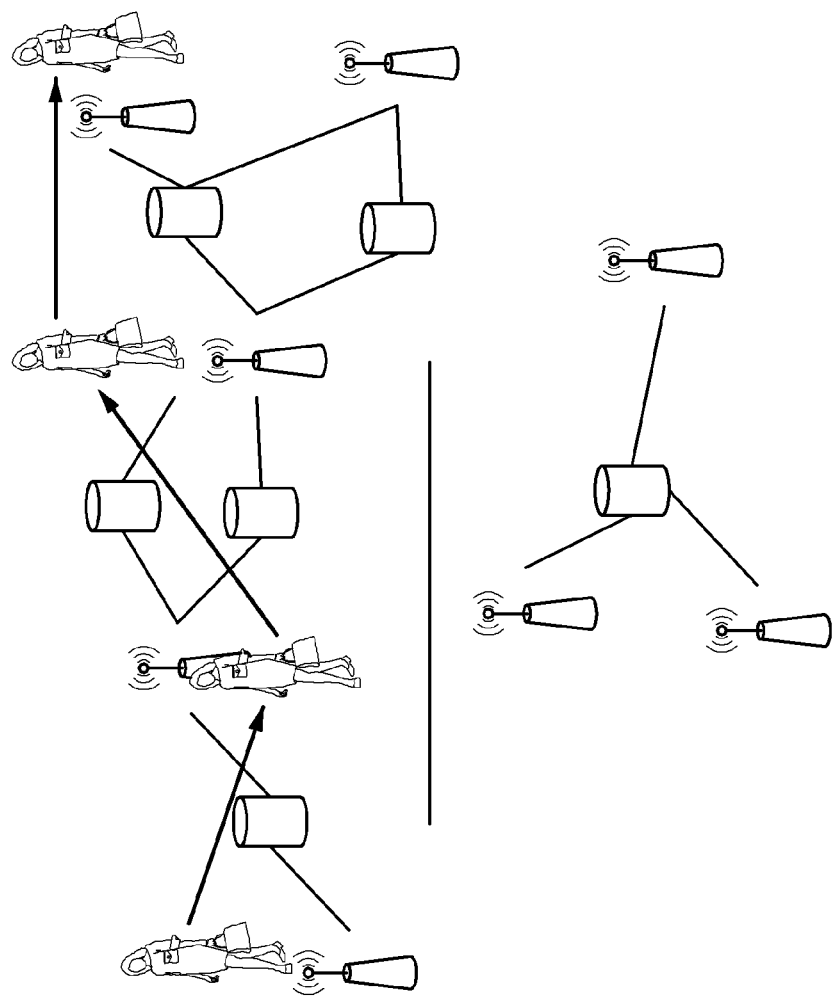
FIG. 7 is a view illustrating the meta-path of a recommendation target user on a metamap, according to an embodiment of the present invention.

FIG. 7 is a view illustrating the meta-path of a recommendation target user on a metamap, according to an embodiment of the present invention.

Referring to FIG. 7, the meta-path of a recommendation target user on a metamap, according to an embodiment of the present invention, may be represented as a location relative to the locations of access points and stores displayed on the metamap.

Through the meta-path of a recommendation target user, it may be detected which access point is near the user or which access points the user has passed through. Whether the user is moving to the east side or the west side on the relevant level, or whether the user is moving along a specific corridor may not be checked using the meta-path on the metamap, but which stores are close to the area in which the user is moving may be detected. Therefore, vouchers for nearby stores may be provided, or products may be recommended based on user preference detected for individuals.

Figure 8:
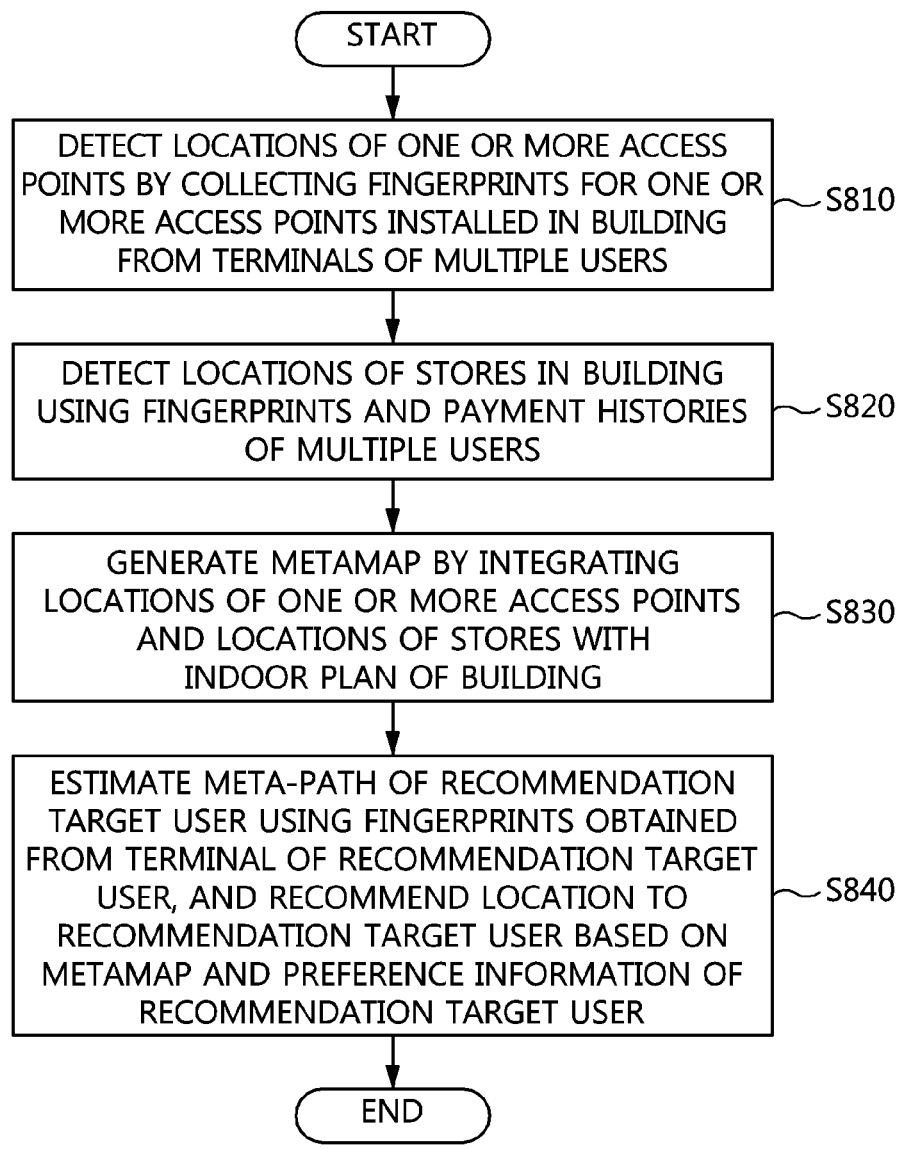
FIG. 8 is a flowchart illustrating a method for recommending locations in a building, according to an embodiment of the present invention.

FIG. 8 is a flowchart showing a method for recommending locations in a building, according to an embodiment of the present invention.

Referring to FIG. 8, the method for recommending locations in a building, according to an embodiment of the present invention, may detect the locations of one or more access points by collecting fingerprints for the one or more access points installed in a building from multiple user terminals at step S810. The technique using fingerprints is a method in which an indoor magnetic field map is generated in advance and a location is estimated by comparing a value measured by the geometric sensor of a user terminal with the information in the map.

In this case, the number of the one or more access points installed in the building may be detected using the fingerprints. For example, when multiple users move around each level of a specific building, fingerprints of access points may be collected through communication with the access points installed in various locations. In the case of an access point, there may be interference between levels according to the building, but the number of access points present in a building may be detected when information from multiple users has been accumulated.

Also, the method for recommending locations in a building, according to an embodiment of the present invention, may detect the locations of stores in a building using the fingerprints collected from the terminals of multiple users and payment histories of the multiple users at step S820.

In this case, using the difference between the time when a fingerprint is acquired and the payment time included in a payment history, it is possible to detect the locations of one or more adjacent stores located in a range predetermined based on each of one or more access points. For example, if the fingerprint of the access point A is acquired from the terminal of a specific user at 2:50 p.m. and the specific user made a payment at the store B at 3 p.m., the store B may be located on a concentric circle that indicates 10-minute walking distance from the access point A.

In this case, if the difference between the time at which the fingerprint is acquired and the payment time falls within a predetermined reference difference, the locations of the one or more adjacent stores may be detected. For example, the reference difference is set by considering the average stride of adults, the size of the building, and the like, and among information generated from multiple users, only the information satisfying the condition in which the difference between the time when a fingerprint is acquired and the time when payment is made at a specific store falls within the predetermined reference difference may be used to detect the location.

In this case, the locations of the one or more adjacent stores may be relative locations based on an access point corresponding to the one or more adjacent stores, the access point being selected from the one or more access points.

Here, if there are two or more access points corresponding to the one or more adjacent stores, the locations of the one or more adjacent stores may be corrected using the relative locations to each of the two or more access points corresponding to the one or more adjacent stores. For example, an area in which a specific store is more likely to exist according to the payment history may be determined based on the access points. If, based on two access points, areas with high probability that a specific store exists therein overlap each other, it may be detected how far the specific store is located from the two access points. When the relationship between a specific store and multiple access points is calculated according to probabilities through such a method, the range including the location of the specific store may be precisely determined.

In this case, which level the stores are located on may be detected using at least one of periodically collected store location information and user comments collected on the Web. Using the fingerprints of access points acquired from the terminals of multiple users, the locations or the number of the access points in a building can be detected, but it is difficult to detect which level each of the access points is located on. The level on which the access points are located may be accurately detected by overlapping the locations of all the access points on the indoor map in advance, but it is difficult to apply this method to a plurality of various buildings in practice. Therefore, the level may be detected using the store location information periodically collected by people, or the level may be estimated by intensively analyzing keywords such as 'building name', 'location name', 'store name', and 'level' included in user comments collected on the Internet 130. For example, information indicating that the store 'Gimbab Sarang' is located on the '10th' floor of the 'COEX' building may be obtained and the level may be detected by collecting user comments on the Internet, such as "I went to 'COEX' and had lunch at 'Gimbab Sarang'", or "The food at 'Gimbab Sarang' on the '10th floor' tastes good".

Also, the method for recommending locations in a building, according to an embodiment of the present invention, may generate a metamap by integrating the locations of one or more access points and stores with the indoor plan of a building at step S830. For example, the metamap may be represented in the form of a graph showing the relationship between a store and an access point by continuously marking the point at which the probability that the specific store exists is the highest based on the specific access point. In this case, because of high mobility between levels or the locations of access points, the relative location of a store that is located on a level different from the level on which the access point is located may be calculated. However, the effect of interference between levels may be decreased by data collected from multiple users, and a store connected to a certain number of access points is difficult to connect to another access point. Therefore, when an access point and a store are not connected to each other, the store and the access point are assumed to be on different levels, and they are assumed not to be within interference range.

Also, the method for recommending locations in a building, according to an embodiment of the present invention, may estimate the meta-path of a recommendation target user using the fingerprints acquired from the terminal of the recommendation target user, and may recommend locations to the recommendation target user based on the meta-path, using the metamap and the information about the preferences of the recommendation target user at step S840. For example, using the fingerprints acquired from the terminal of the recommendation target user, which access point is located near the user may be detected, and the meta-path showing which access points the user has passed through may be estimated. Actually, whether the user is moving to the east side or the west side or whether the user is moving along a specific corridor cannot be known, but it is possible to detect which stores are close to the area that the user is moving to. Also, for example, if the user preference information includes the name of a specific store, the location of the specific store located near the meta-path of the user may be recommended.

In this case, using the category information, the location of a recommended store corresponding to the preference information, selected from one or more adjacent stores corresponding to the current location of a recommendation target user on the meta-path, may be recommended to the recommendation target user. For example, if the information about the preferences of the recommendation target user includes information about clothes or accessories such as bags, the location of an adjacent store corresponding to the category of clothes or accessories may be recommended by being selected from the one or more adjacent stores.

In this case, the location of a recommended store located along the meta-path in the moving direction may be recommended to the user. For example, when the meta-path of the recommendation target user leads from the east side to the west side, a recommended store corresponding to the user preference information may be recommended by being selected from one or more adjacent stores located in the area in which the user will arrive, namely, at least one adjacent store located in the west side.

Also, although not illustrated in FIG. 8, the method for recommending locations in a building, according to an embodiment of the present invention, may acquire payment histories of multiple users. For example, payment transaction information generated in a store may be acquired using a mobile card mounted in a user terminal, or payment histories may be acquired through a service in which both smart phone subscriber information and card payment histories of the subscriber are obtained.

Also, although not illustrated in FIG. 8, the method for recommending locations in a building, according to an embodiment of the present invention, may obtain an indoor plan on which at least one of the area and the length of each section of a building is electronically marked.

In this case, at least one of the tenant information of the stores corresponding to the indoor plan and the category information for each of the stores, acquired using the tenant information, may be overlaid on the indoor plan. For example, the type of business is analyzed based on the name or the business registration number of the store overlaid on the indoor plan, whereby the category information, for example, whether the store is a restaurant or a clothing store, may be detected. This information may be detected based on business name registration information, and may additionally be detected by collecting content on the Internet. Also, information about product lines or the type of goods sold by each of the stores may be accumulated by collecting information. Also, it is possible to induce a store, which intends to provide recommendations for a specific user group in a building, to voluntarily provide information through a system.

In this case, the tenant information may be updated using payment histories. For example, when payment histories for a store that was located in a specific location A have not been made for a long time or when the type of goods paid for, checked via the payment histories, has changed, the tenant information may be updated to reflect that the store that was in A has gone or that the type of business in the store in A has changed. Also, because a large-scale store such as a movie theater or a superstore is less likely to disappear in a short time, information about the level such a store is located on is collected, and the location may then be fixed.

Also, although not illustrated in FIG. 8, the method for recommending locations in a building, according to an embodiment of the present invention, may transmit discount vouchers corresponding to the recommended store to the terminal of the recommendation target user. For example, when the recommendation target user is near a theater in a relevant building, a discount voucher for a movie is transmitted to the terminal of the recommendation target user, or vouchers for restaurants located in the relevant building or a nearby building may be transmitted by detecting payment histories in the theater in real time.

Using the method for recommending locations in a building, the location of a recommendation target user is detected through indoor positioning and locations are recommended according to user preference, whereby the recommendation target user may conveniently and quickly move in a building.

The method for recommending locations in a building, according to the present invention, may be implemented as a program that can be executed by various computer means. In this case, the program app may be recorded on a computer-readable storage medium. The computer-readable storage medium may include program instructions, data files, and data structures solely or in combination. Program instructions recorded on the storage medium may have been specially designed and configured for the present invention, or may be known to or available to those who have ordinary knowledge in the field of computer software. Examples of the computer-readable storage medium include all types of hardware devices specially configured to record and execute program instructions, such as magnetic media, such as a hard disk, a floppy disk, and magnetic tape, optical media, such as CD-ROM and a DVD, magneto-optical media, such as a floptical disk, ROM, random access memory (RAM), and flash memory. Examples of the program instructions include machine code, such as code created by a compiler, and high-level language code executable by a computer using an interpreter. The hardware devices may be configured to operate as one or more software modules in order to perform the operation of the present invention, and vice versa.

As described above, a device for recommending locations in a building using fingerprints of access points and a method using the device are not limited and applied to the configurations and operations of the above-described embodiments, but all or some of the embodiments may be selectively combined and configured so that the embodiments may be modified in various ways.

INDUSTRIAL APPLICABILITY

According to the present invention, the locations of access points are detected by collecting fingerprints for the access points from terminals of multiple users, the locations of stores in a building are detected by using the fingerprints and payment histories of multiple users, and locations based on a meta-path may be recommended to a recommendation target user using a metamap generated by integrating the locations of the access points and stores with the indoor plan of the building. Furthermore, in providing a location recommendation service, the service may be provided without organizing information about the infrastructure of the building in advance, and it is easy to update information in response to the change of stores or the change of access point locations, which may be caused by the replacement of equipment. Therefore, material and time resources required for constructing information in advance for the location recommendation service may be saved.

The invention claimed is:

1. A device for recommending a location in a building, comprising:
an access point location detection unit for detecting locations of one or more access points by collecting fingerprints for the one or more access points installed in the building from terminals of multiple users;
a store location detection unit for detecting locations of stores in the building using the fingerprints and payment histories of the multiple users;
a metamap generation unit for generating a metamap by integrating the locations of the one or more access points and the locations of the stores with an indoor plan of the building;
a user path estimation unit for estimating a meta-path of a recommendation target user using the fingerprints obtained from a terminal of the recommendation target user; and
a location recommendation unit for recommending a location to the recommendation target user based on the meta-path, using the metamap and preference information of the recommendation target user.

2. The device of claim 1, wherein the store location detection unit detects locations of one or more adjacent stores located in a range predetermined based on each of the one or more access points among the stores, using a difference between a time when each of the fingerprints is obtained and a payment time included in the payment histories.

3. The device of claim 2, wherein the store location detection unit detects the locations of the one or more adjacent stores when the difference between the time when each of the fingerprints is obtained and the payment time included in the payment histories falls within a predetermined reference difference.

4. The device of claim 2, wherein the locations of the one or more adjacent stores are relative locations to an access point corresponding to the one or more adjacent stores, the access point being selected from the one or more access points.

5. The device of claim 4, wherein when a number of the access points corresponding to the one or more adjacent stores is two or more, the store location detection unit corrects the locations of the one or more adjacent stores using relative locations to each of the two or more access points corresponding to the one or more adjacent stores.

6. The device of claim 4, further comprising, a plan acquisition unit for obtaining the indoor plan on which at least one of an area and a length of each section of the building is electronically marked.

7. The device of claim 6, wherein the plan acquisition unit overlaps at least one of tenant information of the stores corresponding to the indoor plan and category information for the stores obtained using the tenant information on the indoor plan.

8. The device of claim 7, wherein the plan acquisition unit updates the tenant information using the payment histories.

9. The device of claim 7, wherein the location recommendation unit recommends a location of a recommended store corresponding to the preference information to the recommendation target user using the category information, the recommended store being selected from the one or more adjacent stores corresponding to a current location of the recommendation target user on the meta-path.

10. The device of claim 9, wherein the location recommendation unit recommends the location of the recommended store located in a moving direction defined by the meta-path to the recommendation target user.

11. The device of claim 10, further comprising, a discount voucher provision unit for transmitting a discount voucher corresponding to the recommended store to the terminal of the recommendation target user.

12. The device of claim 1, wherein the access point location detection unit detects a number of the one or more access points installed in the building using the fingerprints.

13. The device of claim 1, wherein the store location detection unit detects a level on which the stores are located using at least one of periodically collected store location information and user comment information collected on web.

14. The device of claim 1, further comprising, a payment information acquisition unit for obtaining the payment histories of the multiple users.

15. A method for recommending a location in a building, the method comprising:
detecting locations of one or more access points by collecting fingerprints for the one or more access points installed in the building from terminals of multiple users;
detecting locations of stores in the building using the fingerprints and payment histories of the multiple users;

generating a metamap by integrating the locations of the one or more access points and the locations of the stores with an indoor plan of the building; and estimating a meta-path of a recommendation target user using the fingerprints obtained from a terminal of the recommendation target user and recommending a location to the recommendation target user based on the meta-path, using the metamap and preference information of the recommendation target user.

16. The method of claim 15, wherein detecting the locations of the stores comprises calculating a difference between a time when each of the fingerprints is obtained and a payment time included in the payment histories, and locations of one or more adjacent stores located in a range predetermined based on each of the one or more access points among the stores are detected using the difference between the time when each of the fingerprints is obtained and the payment time included in the payment histories.

17. The method of claim 16, wherein the locations of the one or more adjacent stores are relative locations to an access point corresponding to the one or more adjacent stores, the access point being selected from the one or more access points.

18. The method of claim 17, further comprising, obtaining the indoor plan on which at least one of an area and a length of each section of the building is electronically marked, wherein obtaining the indoor plan is configured to overlap at least one of tenant information of the stores corresponding to the indoor plan and category information for the stores obtained using the tenant information on the indoor plan.

19. The method of claim 18, wherein recommending the location is configured to recommend a location of a recommended store corresponding to the preference information to the recommendation target user using the category information, the recommended store being selected from the one or more adjacent stores corresponding to a current location of the recommendation target user on the meta-path.

20. A non-transitory computer-readable storage medium storing a program for implementing a method for recommending a location in a building, the method comprising:

detecting locations of one or more access points by collecting fingerprints for the one or more access points installed in the building from terminals of multiple users;

detecting locations of stores in the building using the fingerprints and payment histories of the multiple users;

generating a metamap by integrating the locations of the one or more access points and the locations of the stores with an indoor plan of the building; and estimating a meta-path of a recommendation target user using the fingerprints obtained from a terminal of the recommendation target user and recommending a location to the recommendation target user based on the meta-path, using the metamap and preference information of the recommendation target user.

* * * * *